US012451677B2

(12) United States Patent
England

(10) Patent No.: US 12,451,677 B2
(45) Date of Patent: Oct. 21, 2025

(54) DEVICE FOR HOLDING A BUNDLE OF CABLES, CABLE TRACK EQUIPPED WITH AT LEAST ONE SUCH DEVICE, AND ASSEMBLY METHOD

(71) Applicant: LATELEC, Toulouse (FR)

(72) Inventor: Sam England, Bristol (GB)

(73) Assignee: LATELEC, Toulouse (FR)

( * ) Notice: Subject to any disclaimer, the term of this patent is extended or adjusted under 35 U.S.C. 154(b) by 231 days.

(21) Appl. No.: 18/549,029

(22) PCT Filed: Mar. 7, 2022

(86) PCT No.: PCT/EP2022/055776
§ 371 (c)(1),
(2) Date: Sep. 5, 2023

(87) PCT Pub. No.: WO2022/189367
PCT Pub. Date: Sep. 15, 2022

(65) Prior Publication Data
US 2024/0154394 A1    May 9, 2024

(30) Foreign Application Priority Data

Mar. 9, 2021 (FR) ......................... 2102240

(51) Int. Cl.
*H02G 3/04* (2006.01)
*H02G 1/08* (2006.01)
*H02G 3/36* (2006.01)

(52) U.S. Cl.
CPC ............. *H02G 3/0437* (2013.01); *H02G 1/08* (2013.01); *H02G 3/36* (2013.01)

(58) Field of Classification Search
None
See application file for complete search history.

(56) References Cited

U.S. PATENT DOCUMENTS

| 2,938,692 | A  | * | 5/1960 | Bosworth | H02G 3/32 |
| | | | | | 248/68.1 |
| 8,502,071 | B2 | * | 8/2013 | Caveney | H02G 3/22 |
| | | | | | 174/72 A |
| 8,756,772 | B2 | * | 6/2014 | Padmore | H02G 3/0418 |
| | | | | | 24/522 |
| 2003/0159846 | A1 | * | 8/2003 | Takahashi | H02G 3/0608 |
| | | | | | 174/68.3 |
| 2012/0193120 | A1 | * | 8/2012 | Edmond | H02G 3/0437 |
| | | | | | 174/68.3 |

(Continued)

FOREIGN PATENT DOCUMENTS

| FR | 2925781 | 6/2009 |
| WO | WO2011027002 | 3/2011 |

*Primary Examiner* — Krystal Robinson
(74) *Attorney, Agent, or Firm* — Defillo & Associates, Inc.; Evelyn A. Defillo

(57) ABSTRACT

Device for holding a bundle of cables (12) in a duct (18) of a cable track, having a bottom (18*f*) surrounded by two parallel flanks (14) that delimit an opening oriented towards a direction referred to as upper along a main axis, this device including a support (2) having fasteners intended to be fastened to the flanks of the duct (14), this support (2) having an axial guide that receives a push bar (6) including a base (10) that projects from the lower face of the support (2), and a non-return system for locking the push bar, allowing it to advance downwards while preventing it from moving backwards.

14 Claims, 3 Drawing Sheets

(56) References Cited

U.S. PATENT DOCUMENTS

| | | | |
|---|---|---|---|
| 2012/0205134 A1* | 8/2012 | Brasier | H02G 3/0443 174/68.3 |
| 2013/0075153 A1* | 3/2013 | Viviant | H02G 3/0418 174/481 |
| 2014/0224520 A1* | 8/2014 | Klein | B60R 16/0215 138/92 |
| 2015/0226354 A1 | 8/2015 | Reed | |

* cited by examiner

[Fig. 1]
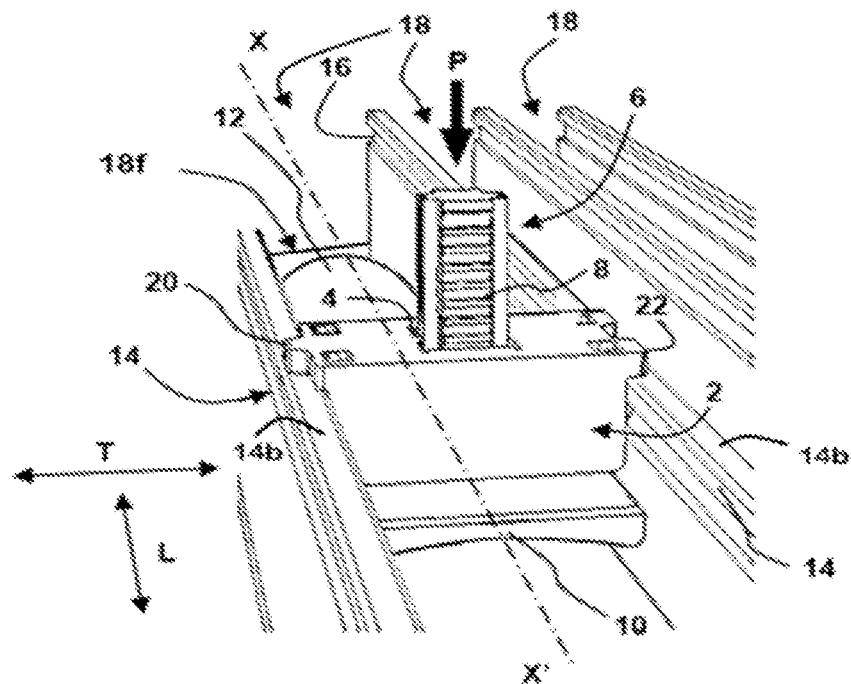
[Fig. 2]
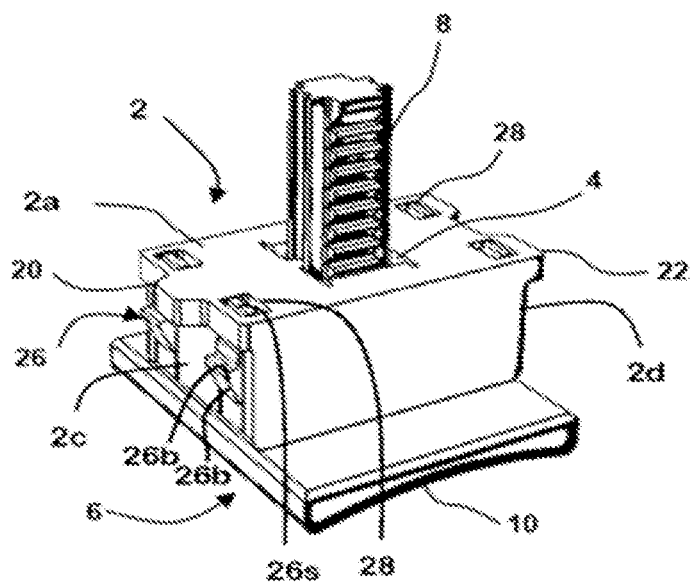

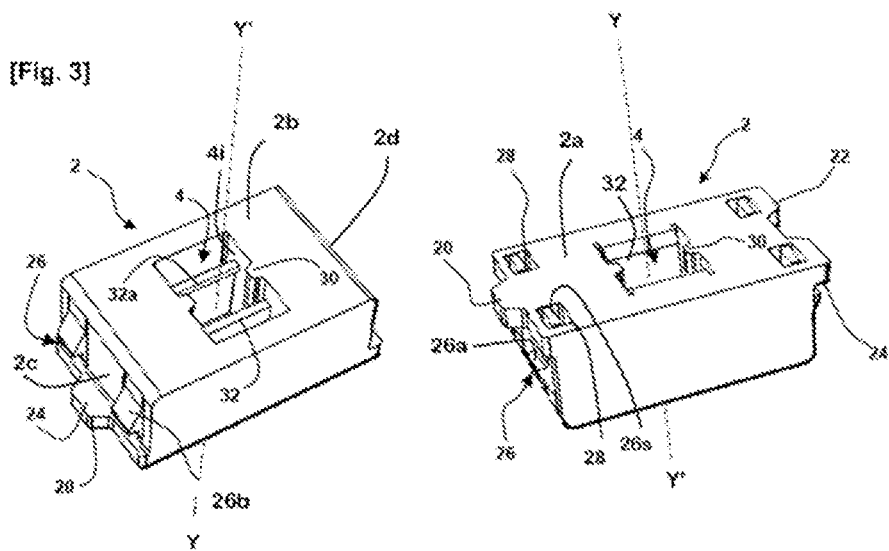
[Fig. 3]
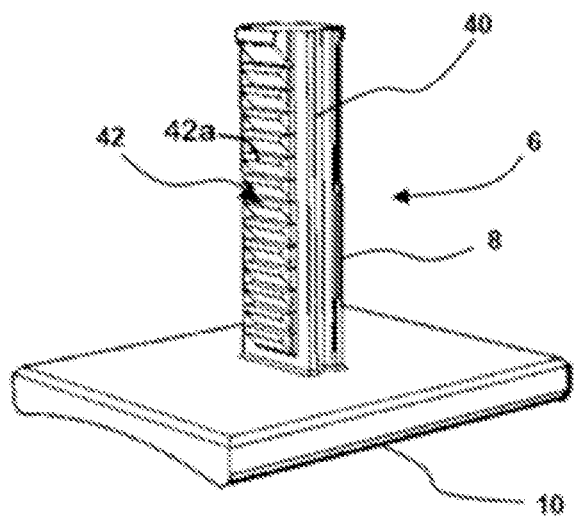
[Fig. 4]

[Fig. 5]
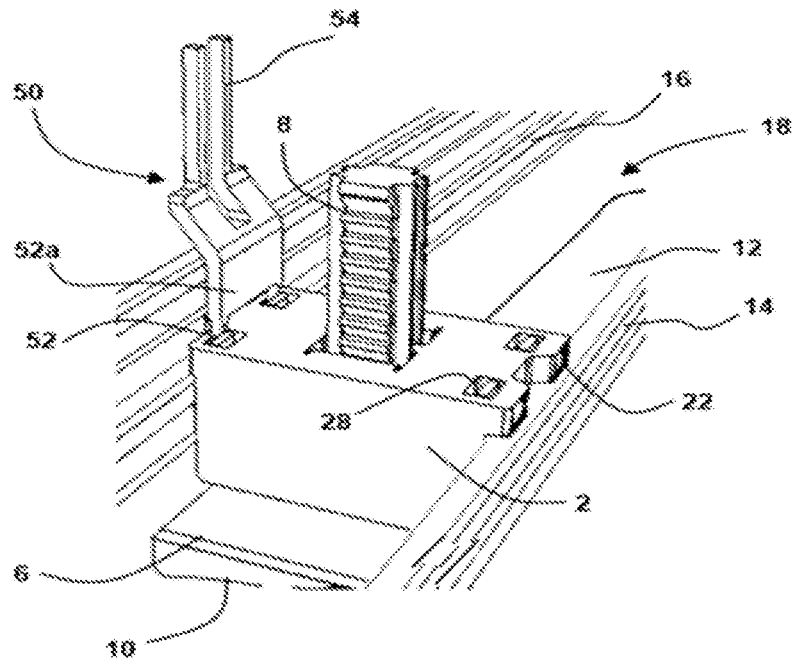
[Fig. 6]
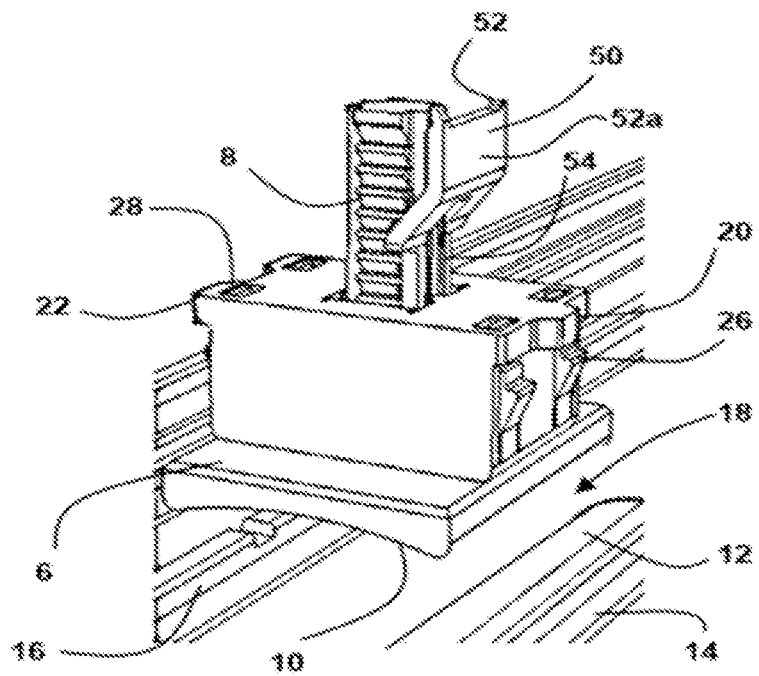

DEVICE FOR HOLDING A BUNDLE OF CABLES, CABLE TRACK EQUIPPED WITH AT LEAST ONE SUCH DEVICE, AND ASSEMBLY METHOD

CROSS REFERENCE TO RELATED APPLICATION

This application is a national stage entry of PCT/EP2022/055776 filed Mar. 7, 2022, under the International Convention and claiming priority over French Patent Application No. FR2102240 filed Mar. 9, 2021.

TECHNICAL FIELD

The present invention relates to a device for holding a bundle of cables in the duct of a cable track, the cable track comprising at least one duct equipped with at least one such holding device, as well as a method for assembling this device in such a cable track.

The bundles of cables, or harnesses, which are used in a vehicle, and generate vibrations, in particular in aircraft, are generally positioned in ducts of a cable track, which can comprise a plurality of parallel tracks each receiving a bundle which must be held in the interior.

Each bundle which is guided and secured in a duct is thus protected against the other adjacent bundles, as well as against the immediate environment, in particular against mechanical stresses such as friction which can give rise to wear of the cable coverings.

PRIOR ART

A known device for holding a bundle of cables, presented in particular by document U.S. Pat. No. 4,136,257A, uses a cable track duct forming a "U" which is open at the top, comprising in its two flanks close vertical slots which open at the top, and leave between them a regular succession of vertical lugs.

Each vertical lug can receive a clasp comprising a contour which fits around this lug, and is equipped with a rim which extends into the duct, in order to come above the bundle. When the clasp is lowered by sliding of its contour along the lug, its rim is supported on the bundle in order to keep it at the bottom of the duct. At the end of the movement, the contour is blocked on bosses formed on the side of the lug, in order to lock its height.

However, this holding device makes it necessary to cut the flanks of the ducts in order to form the lugs distributed along the length, which complicates the production of the cable track.

In addition, in the case of two parallel ducts formed on a single cable track, having a common wall forming the flanks of these two ducts, it is necessary to produce the vertical slots in this wall in order to obtain the lugs. The contour of clasps surrounding a lug in order to position the support rim in a duct partly extends into the adjacent duct, which can cause problems of size in this last duct.

Other known holding devices use bores formed in the bottom of the ducts in order to receive fasteners for the bundle, which also complicates the production of the cable track.

In particular, certain sensitive electrical bundles which transmit electrical signals or power currents, in particular for aircraft, must have protection against the electromagnetic waves which they emit, in order to avoid transmitting the waves to the nearby bundles, or receiving them from these nearby bundles.

The electrical bundles must also be protected against risks of electric arcs which could form towards the exterior of their ducts, in particular as a result of the bores in these channels for securing of these bundles. Ducts which have openings such as slots in the flanks or bores in the bottom assure this protection less well.

Other known holding devices comprise supports which are secured on the top of the duct, with a resilient support which descends into the interior in order to be supported on the bundle and hold it on the bottom of its duct. However, for bundles with various diameters, the resilient supports will clamp the bundle in a different way according to its diameter. Irregular clamping is obtained, which could give rise to risks of defects.

As a variant, holding devices could be provided having a plurality of supports with different dimensions designed for various diameters of bundles. In this case, it is necessary to provide a plurality of support references, which complicates the fitting of the bundle during the initial assembly or maintenance operations, increases the costs, and can give rise to errors as a result of a poor choice of support dimensions.

Holding devices of this type are described in particular in U.S. Pat. No. 2,938,692A, FR2925781A1 and US2015/226354A1.

SUMMARY OF THE INVENTION

The objective of the present invention is in particular to avoid these problems of the prior art. For this purpose, it proposes positioning a local means for reversible blocking of the cable bundle in a duct, which means can exert modulable pressure on this bundle.

More specifically, the subject of the present invention is a device for holding a cable bundle in a cable track duct, a duct of this type comprising a bottom which is framed by two parallel flanks. The holding device comprises a support with parallel faces, known as the upper and lower faces, and, perpendicularly to this upper face, two opposite parallel lateral walls. These walls are provided with retractable fasteners which are designed to be secured on the flanks of the duct. This support has a central guide bore extending along an axis perpendicular to the upper face. A rod of a movable thruster is accommodated in this bore, with the rod ending in a base orthogonal to the rod, which base can exert pressure on said bundle, and said bore comprises a system for non-return blocking of the rod which allows the rod to advance in a direction moving said base away . . . , while preventing it from withdrawing in the inverse direction.

An advantage of this holding device is that, in each duct of a cable track, which can comprise a plurality of parallel channels, and after having positioned the bundle in this duct, it makes it possible to secure the support in an individual manner by hooking it onto the inner flanks of the duct, then, by means of a simple movement of pressure by the finger without using a tool, to lower the thruster in order to place its base supported on the bundle. The thruster then retains its position relative to the base, thus clamping the bundle thanks to its non-return blockage.

Individual and rapid assembly of the bundle is obtained, which in each location can be held and clamped in a duct comprising a continuous bottom and flanks, which makes it possible, with a single type of holding device, to carry out easily the initial assembly, and, if necessary, intervene individually and locally on the bundle for maintenance operations. In addition, the ducts have a continuous contour without an opening, thus permitting simplified production, as well as good electrical and electromagnetic protection.

The holding device according to the invention can advantageously comprise one or more of the following preferred characteristics, which can be combined with one another.

Advantageously, the blocking system comprises resilient ratchets which are secured in the bore of the support, these ratchets being engaged in toothing connected to the rod of the thruster.

In this case, the guide bore preferably comprises two ratchets, each ratchet being engaged in one of the two sets of toothing formed on two opposite surfaces of the rod.

Also advantageously, the guide bore comprises at least one rib parallel to its axis, which rib is engaged in a corresponding groove of the rod, in order to guide it.

Advantageously, the lateral walls of the support comprise bosses extending the upper face, with a lower face which is designed to act as a support on the flanks of the duct.

In this case, one of the lateral walls has a central boss, and the other wall has two bosses which form between one another a hollow complementary to the central boss.

Advantageously, the retractable fasteners of the lateral walls of the support are constituted by at least one resilient hook, which can engage in a groove formed along each duct flank.

Advantageously, each hook can have an overhang which projects from the lateral wall. This overhang has a free end on the side of the upper face of the support, and is attached to said wall by a beveled edge on the side of the lower support face.

In particular, the support can comprise at least one hook on each lateral wall, in order to maintain at least one grip on each side in the case of detachment of a hook.

In addition, the free end of the overhang of each hook can be in the form of a tongue positioned with a gap in a receptacle extending parallel to the axis of the bore.

In this case, advantageously, the holding device comprises a disengagement tool comprising at one end points which can engage along receptacles of the hooks of a single lateral wall in order to thrust these hooks towards the central bore.

In addition, advantageously, the disengagement tool comprises arms at another end, which can engage in the central bore comprising the resilient ratchets, in order to disengage these ratchets from the toothing of the thruster.

The invention also relates to a cable track comprising at least one duct in which a bundle of cables is guided, the bundle being held by one or a plurality of regularly spaced holding devices.

The subject of the invention is also a method for assembly of a holding device as defined above in said cable track, comprising a step of securing the support on the flanks of the duct by: introduction of the device towards the bottom of the duct, the device having dimensions such that the walls of the support are flush with the flanks, the hooks then being retracted into the lateral walls of the support; stoppage of this introduction when the bosses are supported on the upper edges of the duct flanks, and, simultaneously, the hooks are inserted in the groove formed in each duct flank; then a step of clamping of the bundle of cables by pressing on the rod of the thruster.

This assembly method can be followed subsequently by a step of detachment of the holding device by removal of the hooks of the support by means of the disengagement tool defined above, by insertion of the points along the receptacles for the hooks of each lateral wall, in order to thrust them towards the central bore, and thus remove the support from the flanks of the duct, then a step of moving away of the non-return blocking system and withdrawal of the thruster by engagement of the arms of the disengagement tool against the resilient ratchets of the central bore, in order to disengage these ratchets from the toothing of the thruster.

In the present text, the terms "upper" or "above", and respectively "lower" or "below" relate to a part of an element which, in the usage mode, is furthest or respectively closest to the bottom of the corresponding duct. In addition, "horizontal", and respectively "vertical" qualify an element which, in the usage mode, extends on a plane which is parallel, or respectively an axis which is perpendicular, to the bottom of the corresponding channel.

BRIEF DESCRIPTION OF THE DRAWINGS

The invention will be better understood, and other characteristics and advantages will become apparent in detail from reading the following description provided by way of non-limiting example, with reference to the appended drawings, which represent respectively:

FIG. 1 is a view of a holding device according to the invention secured in a duct of a cable track;

FIG. 2 is a view of this holding device alone;

FIG. 3 is a view of the support of this holding device showing said device in succession from below and from above;

FIG. 4 is a view of the thruster of this holding device;

FIG. 5 is a view showing the removal of the support from the duct;

FIG. 6 is a view showing the release of the thruster from this support.

DETAILED DESCRIPTION OF THE INVENTION

FIG. 1 shows a cable track comprising a plurality of parallel ducts 18, comprising a longitudinal direction L positioned along the length of this track, and a transverse direction T which is perpendicular to it.

Each duct 18 has a rectangular transverse cross-section which is open at the top, formed by a flat bottom 18f and two parallel flanks 14 each having a longitudinal groove 16 facing towards the axis X'X of this duct.

FIGS. 1 and 2 illustrate a holding device clamping the bundle 12 at the bottom 18f of the duct 18. This device comprises a support 2 which is secured at each side in the longitudinal groove 16 of a flank, and this support 2 receives a rod 8 of a thruster 6 in a guide bore 4 formed in the center of the support 2.

A substantially flat base 10 is secured at the lower end of the rod 8, below the support 2. This base has a globally rectangular form fitted between the flanks of the duct 14, and extending from the support 2 in the longitudinal direction L of said duct. The lower face of the base 10 comprises an active surface which, in the transverse direction, has convex curvature which fits on the bundle 12, in order to distribute the pressure, while avoiding excessive mechanical stress which could damage it.

In general, the bundle of cables can comprise one or a plurality of cables of any kind, comprising for example electrical cables, optical fibers or channels, in particular harnesses or bundles of cables which are used more particularly in the aeronautical industry. The cable track without an opening along its length is formed in this example by a continuous extrusion process.

FIG. 3 shows the support 2 comprising an elongate substantially parallelepiped form in the transverse direction T, with upper 2a and lower 2b faces and opposite lateral walls 2c and 2d, which extend perpendicularly to the transverse direction T. In this direction T, the support 2 comprises, on the top of the edges 14b of the flanks 14, on one side a central boss 20, and on the other side two lateral bosses 22, leaving between them a hollow corresponding to the central boss of another support, not represented, which is intended for a juxtaposed duct 18. These bosses 20, 22 have lower faces 24 positioned on the same plane, and supported on the top of the edges of flanks 14b.

In the case of two ducts 18 juxtaposed on a single cable track, the hollow between the lateral bosses 22 makes it possible to position in these ducts two supports 2 which are transversely aligned (in the direction T) with the central boss 20 of one support fitting into the hollow of the other support.

The bosses 20 and 22 are formed on the lateral walls 2c and 2d of the support 2, while extending the upper face 2a of the support 2.

On each side of the support 2, the lateral walls 2c and 2d comprise below the bosses 20, 22 two retractable resilient hooks 26, which extend transversely, projecting from the sides of the support 2 by means of an overhang 26a, on the side of the upper face 2a. This overhang 26a, which is substantially flat, and horizontal in use, extends by means of a free end 26s on the side of the upper face 2a of the support 2, and is attached to the wall 2c, 2d by a beveled edge 26b on the side of the lower face 2b of the support 2.

The beveled edges 26b form inclined faces which, during the descent into the duct 18, permit retraction of the hooks 26 by compression on the flanks 14, until the overhangs 26a reach the level of the longitudinal groove 16 positioned along each flank 14. The overhangs 26a of the hooks 26 then relax by fitting into the grooves 16, thus preventing the support 2 from rising.

Each hook 26 connected to the support 2 by the lower end of its beveled edge 26b is extended by the free end 26s of its overhang 26a, which reaches the upper face 2a of this support in a vertical receptacle 28 with a gap, thus permitting minor transverse movement of the hook 26 in this receptacle 28.

The guide bore 4 positioned in the center of the support 2 comprises a substantially rectangular horizontal cross-section, and extends along an axis Y'Y perpendicular to the parallel faces 2a and 2b. On each side, in the transverse direction, this bore 4 comprises a vertical central guide rib 30.

The guide bore 4 also comprises two resilient ratchets 32 which extend substantially transversely. Each ratchet 32 is secured on the support 2 by its upper end, and at its lower end comprises a lug 32a facing towards the center of the bore 4.

FIG. 4 relates in particular to the rod 8 of the thruster 6, comprising a cross-section which fits into the guide bore 4 of the support 2, comprising on each side in the transverse direction a groove 40 which receives a rib 30 of the bore in order to assure the centering of the rod in this bore.

Each opposite surface of the rod 8 which faces in the longitudinal direction in the usage mode comprises toothing 42 equipped with a series of teeth 42a comprising an inclined lower face and a horizontal upper face in the usage mode. Each set of toothing 42 receives the lug 32a of one of the ratchets 32 of the support 2, which, during the descent of the thruster 6, can thus slide on the inclined lower faces of this toothing with resilient withdrawal. At the end of the descent, the lug 32a of each ratchet 32 is blocked on the horizontal upper face of one of teeth 42a of the toothing 42, thus preventing the thruster 8 from rising once more.

By this means, starting from a high position of the thruster 6 in the support 2—i.e. with the base 10 positioned against or in the vicinity of the lower face 2b of the support 2 (cf. FIG. 2)—a simple and rapid thrust P (cf. FIG. 1), exerted without tooling by a finger pressing on the upper end of the rod 8, lowers this thruster in order to support the base 10 on the bundle 12. After release of the finger, the thruster 6 can no longer rise once more, with the bundle 12 thus being wedged in position at the bottom of the duct 18f.

FIG. 5 shows a disengagement tool 50, which can advantageously form part of the holding device. This tool 50 extends with a flat form, comprising in its lower part a plate 52a which ends in two spaced points 52 facing downwards.

Each point 52 descends into a vertical receptacle 28 of a free end 26s of a hook 26, being supported on the side of the hook 26 which is furthest from the central bore 4. Manual thrusting on the disengagement tool 50 thus makes it possible to withdraw each of the two hooks 26 towards the center of the support 6, which disengages them from the longitudinal groove 16 of the flank of the duct 14.

If is thus possible to raise one side of the support 2 formed by one of the lateral walls 2c or 2d, after having disengaged its hooks 26, then proceed in the same manner and simultaneously on the other side in order to disengage the two other hooks. The complete holding device is thus released from the cable track.

FIG. 6 illustrates the disengagement tool 50 in the overturned position, comprising two parallel arms 54 facing downwards, and extending on a parallel plane which is offset towards the interior of the duct 18 relative to the plate 52a comprising the points 52, in order to space this plate from the rod 8. In this position, the tool 50 makes it possible to release the thruster 6 as described hereinafter.

Each parallel arm 54 is inserted in the bore of the support 4 against a face of the thruster rod 8, in the longitudinal direction L, more specifically between a ratchet 32 and this rod 8. Then, by lowering the disengagement tool 50, each arm end 54 presses on a ratchet 32 in order to thrust it in the longitudinal direction in the direction opposite the central bore 4, which makes it possible to disengage the lug 32a from this ratchet 32 of the toothing 42 of the thruster rod 8.

When the upper end of the thruster rod 8 is pulled, the thruster 6 is raised, and is then released. The thruster is thus returned to the upper position, and the complete holding device, which is in its initial position, can then be reused, thus making it possible to reduce the costs.

Advantageously, the support 2 and the thruster 6 are each formed in a single piece by molding of plastics material, which makes it possible to produce the complex forms of these parts economically.

The invention is not limited to the examples described and represented. The non-return blocking system can be formed by rack elements, or by a retractable extension which is positioned in the walls of the bore, and can be inserted reversibly in the toothing of the rod of the thruster. In addition, the retractable hooks can be constituted by balls or slides which are made removable by pressure exerted by a return spring. In addition, in the embodiment example, the receptacles of the free ends can be open, and the bosses can be optional, or exist on only one side. Furthermore, the central bore can be offset transversely to one side or the other of the support.

The invention claimed is:

1. A holding device for a cable bundle (12) in a cable track duct (18) comprising:
a bottom (18f) which is framed by two parallel flanks (14), a support (2) with an upper face (2a) and a lower (2b) faces, the upper face (2a) and the lower face (2b) are parallel and, perpendicularly to these faces, two opposite parallel lateral walls (2c, 2d) provided with retractable fasteners (26) which are designed to be secured on the flanks of the duct (14), and comprising overhangs which relax by fitting into grooves (16) formed along each flank (14) of the duct (18), said support (2) having a central guide bore (4) extending along an axis (Y'Y) perpendicular to the upper face (2a), and in which there is accommodated a rod (8) of a movable thruster (6), with the rod ending in an orthogonal base (10) extending from the lower face (2b) of the support (2), and which base exerts pressure on said bundle (12), said bore comprising a system for non-return blocking of the thruster (6) which allows the thruster to advance in a direction moving said base (10) away from the lower face (2b), while preventing it from withdrawing in the inverse direction,
wherein the blocking system is constituted by resilient ratchets (32) secured in the bore (4) of the support (2), these ratchets being engaged in toothing (42) connected to the thruster (6).

2. The holding device as claimed in claim 1, wherein the support bore (4) comprises two ratchets (32), which are engaged in two sets of toothing (42) formed on two opposite surfaces of the rod (8).

3. The holding device as claimed in claim 1, wherein the guide bore (4) comprises at least one rib (30) parallel to its axis (Y'Y), which rib is engaged in a corresponding groove (40) of the rod (8), in order to guide the rod.

4. The holding device as claimed in claim 1, wherein the lateral walls (2c, 2d) comprise bosses (20, 22) extending the upper face (2a), and with a lower face (24) which is designed to act as a support on the flanks of the duct (14).

5. The holding device as claimed in claim 4, wherein one of the lateral walls (2c) has a central boss (20), and the other wall (2d) has two bosses (22) which form between one another a hollow (24) complementary to the central boss (20).

6. A method for assembly of a holding device as claimed in claim 4 in a cable track having at least one duct (18) in which a bundle of cables (12) is guided, wherein said bundle (12) is held by one holding device including a bottom (18f) which is framed by two parallel flanks (14), a support (2) with an upper face (2a) and a lower (2b) face, the upper face (2a) and the lower face (2b) are parallel and, perpendicularly to these faces, two opposite parallel lateral walls (2c, 2d) provided with retractable fasteners (26) which are designed to be secured on the flanks of the duct (14), and comprising overhangs which relax by fitting into grooves (16) formed along each flank (14) of the duct (18), said support (2) having a central guide bore (4) extending along an axis (Y'Y) perpendicular to the upper face (2a), and in which there is accommodated a rod (8) of a movable thruster (6), with the rod ending in an orthogonal base (10) extending from the lower face (2b) of the support (2), and which base exerts pressure on said bundle (12), said bore comprising a system for non-return blocking of the thruster (6) which allows the thruster to advance in a direction moving said base (10) away from the lower face (2b), while preventing it from withdrawing in the inverse direction,
wherein the blocking system is constituted by resilient ratchets (32) secured in the bore (4) of the support (2), these ratchets being engaged in toothing (42) connected to the thruster (6);
wherein the method comprises a step of securing the support (2) on the flanks (14) of the duct (18) by:
introduction of the device towards the bottom of the duct (18f), the device having dimensions such that the lateral walls (2c, 2d) of the support are flush with the flanks (14), the hooks (26) then being retracted into the lateral walls of the support;
stoppage of this introduction when the bosses (20, 22) are supported on the upper edges (14b) of the duct flanks (14), and, simultaneously, the hooks (26) are inserted in the groove (16) formed along each duct flank (14);
then a step of clamping of the bundle of cables (12) by the thruster base (10) by pressing on the rod (8) of the thruster (6).

7. A method for dismantling of a holding device as claimed in claim 4, wherein after implementation of the method as claimed in claim 6, the device is subsequently detached by a step of removal of the hooks (26) of the support (2) from the duct flanks (14) by the disengagement tool (50), by insertion of the points (52) along the receptacles (28) for the hooks, in order to thrust them towards the central bore (4), and thus remove the support (2) from the duct flanks (14), then a step of moving away of the non-return blocking system and withdrawal of the thruster (6) by engagement of the arms (54) of the disengagement tool (50) against the resilient ratchets (32) of the central bore (4), in order to disengage these ratchets from the toothing of the thruster (42).

8. The holding device as claimed in claim 1, wherein the retractable fasteners of the lateral walls (2c, 2d) of the support (2) are constituted by at least one resilient hook (26), which can engage in said groove (16).

9. The holding device as claimed in claim 8, wherein each hook (26) has an overhang (26a) which projects from the lateral wall (2c, 2d), this overhang (26a) has a free end (26s) on the side of the upper support face (2a), and is attached to said wall (2c, 2d) by a beveled edge (26b) on the side of the lower support face (2b).

10. The holding device as claimed in claim 9, wherein the support (2) comprises at least one hook (26) on each lateral wall (2c, 2d).

11. The holding device as claimed in claim 9, wherein the upper free end (26s) of the overhang (26a) of each hook (26) is in the form of a tongue positioned with a gap in a receptacle (28) extending parallel to the axis of the bore (Y'Y).

12. The holding device as claimed in claim 11, further comprising a disengagement tool (50) comprising at one end points (52) which engage along receptacles (28) of the hooks (26) of a single lateral wall (2c; 2d) in order to thrust these hooks towards the central bore (2).

13. The holding device as claimed in claim 12, wherein the disengagement tool (50) comprises arms (54) at another end, which can engage in the central bore (4) comprising the resilient ratchets (32), in order to release the ratchets (32) from the toothing of the thruster (42).

14. A cable track comprising at least one duct (18) in which a bundle of cables (12) is guided, wherein said bundle (12) is held by one holding device as claimed in claim 1.

* * * * *